(12) United States Patent
Simpson et al.

(10) Patent No.: US 7,577,449 B2
(45) Date of Patent: Aug. 18, 2009

(54) METHOD AND SYSTEM FOR COORDINATING A SLEEP MODE WAKE-UP TIME

(75) Inventors: Floyd D. Simpson, Lake Worth, FL (US); Huai Y. Wang, Coconut Creek, FL (US)

(73) Assignee: Motorola, Inc., Schaumburg, IL (US)

( * ) Notice: Subject to any disclaimer, the term of this patent is extended or adjusted under 35 U.S.C. 154(b) by 213 days.

(21) Appl. No.: 11/427,414

(22) Filed: Jun. 29, 2006

(65) Prior Publication Data

US 2008/0004044 A1      Jan. 3, 2008

(51) Int. Cl.
*H04Q 7/20* (2006.01)
(52) U.S. Cl. .................... 455/458; 455/456.1; 455/439; 455/574
(58) Field of Classification Search ................ 455/458, 455/457, 456.1
See application file for complete search history.

(56) References Cited

U.S. PATENT DOCUMENTS

| 7,039,430 B2 * | 5/2006 | Kang et al. .................. 455/458 |
| 2004/0235536 A1 | 11/2004 | Kim et al. |
| 2005/0197125 A1 * | 9/2005 | Kang et al. .................. 455/439 |
| 2006/0025134 A1 * | 2/2006 | Cho et al. ................. 455/435.1 |

* cited by examiner

*Primary Examiner*—David Q Nguyen
(74) *Attorney, Agent, or Firm*—Larry G. Brown

(57) ABSTRACT

The invention concerns a method (200) and system (100) for coordinating a sleep mode wake-up time. The method can include the steps of entering (214) a sleep mode and selecting (214) a paging group, advising (216) a base station (110) of the sleep mode and the selection of the paging group and coordinating (218) a wake-up time of the sleep mode with a second power saving mode that includes a common availability time (312) for mobile stations (116) communicating with the base station to detect signals from the base station. As an example, the second power saving mode (300) can be an idle mode, and the common availability time can be a listening interval of the idle mode.

10 Claims, 2 Drawing Sheets

METHOD AND SYSTEM FOR COORDINATING A SLEEP MODE WAKE-UP TIME

BACKGROUND OF THE INVENTION

1. Field of the Invention

The present invention concerns the coordination of communications systems and more particularly, the coordination of mobile units in a sleep mode.

2. Description of the Related Art

Under the 802.16e standard, mobile units that are communicating with a base station may enter a sleep mode. In the sleep mode, certain portions of the mobile unit may be temporarily shut down in an effort to conserve battery life. During this sleep mode, the mobile unit maintains its registration with the base station, and as such, set-up times for certain applications, like VoIP or push-to-talk calls, remains quick.

In sleep mode, each mobile unit sets its wake-up times and communicates this with the base station. In response, the base station will transmit a traffic indicator to the mobile units during each mobile unit's wake-up time. As such, the wake-up times in sleep mode are uncoordinated and the base station must constantly transmit traffic indicators to the mobile units during their wake-up times. Even worse, the base station must transmit the traffic indicator during each wake-up time for each mobile unit, even if the traffic indicator indicates that there is currently no traffic for the mobile units. This process places a considerable strain on the base station and may tie up network resources.

SUMMARY OF THE INVENTION

The present invention concerns a method for coordinating a sleep mode wake-up time. The method can include the steps of entering a sleep mode and selecting a paging group, advising a base station of the sleep mode and the selection of the paging group and coordinating a wake-up time of the sleep mode with a second power saving mode. The second power saving mode may include a common availability time for mobile stations communicating with the base station to detect signals from the base station. As an example, the second power saving mode can be an idle mode, and the common availability time can be a listening interval of the idle mode.

In addition, the paging group can be one of a number of paging groups that are set by the base station for the idle mode. The method can also include the steps of transmitting a location update to the base station and in response, receiving information about the paging groups set by the base station.

In another arrangement, the method can include the step of receiving an indication during the common availability time that may indicate the presence of traffic intended for a mobile station. As an example, the indication can be a paging message. A registration with the base station can be maintained during the entering, advising and coordinating steps. Further, the idle mode can be a mode that mobile stations enter and then de-register from the base station.

The present invention also concerns another method for coordinating a sleep mode wake-up time. The method can include the steps of transmitting messages for at least one group in a power saving mode, receiving from a mobile station an indication that the mobile station has entered sleep mode and has selected one of the groups and transmitting the messages to the mobile station in the sleep mode during a common availability time of the power saving mode. The method can further include the steps of receiving a location update from the mobile station and in response, transmitting information about the paging groups set by the base station. The method can also include the steps of transmitting the paging messages to the mobile station in the sleep mode only during the listening interval of the idle mode and maintaining a registration with the mobile station while the mobile station is in the sleep mode.

The present invention also concerns a mobile device that includes a receiver for communicating with a base station and a processor that is communicatively coupled to the receiver. In a sleep mode, the processor can be programmed to instruct the receiver to selectively shut down and coordinate a wake-up time for the receiver with a common availability time of a second power saving mode such that the receiver activates during the common availability time to receive a message from the base station. The processor can be further programmed to select a paging group that may be set by the base station for the idle mode, and the paging group can have a pre-defined listening interval. During the sleep mode, the processor can be further programmed to maintain a registration with the base station.

The present invention also concerns a base station that includes a transceiver that can transmit messages for at least one group in a power saving mode and can receive from a mobile station an indication that the mobile station has entered sleep mode and has selected one of the groups. The base station may also include a processor that is communicatively coupled to the transceiver. In one arrangement, the processor can be programmed to—in response to the receipt of the indication from the mobile station—instruct the transceiver to transmit the messages to the mobile station in the sleep mode during a common availability time of the power saving mode.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
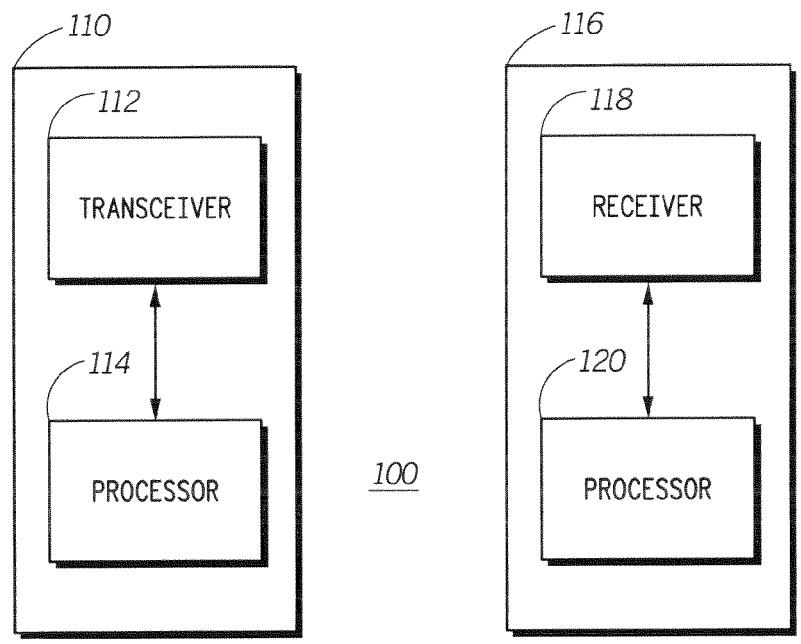
FIG. 1 illustrates a system for coordinating a sleep mode wake-up time in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein. The term "transceiver" can include any component that is capable of receiving and/or transmitting wireless signals. The term "receiver" can include any component that is capable of at least receiving wireless signals.

The present invention concerns a method and system for coordinating a sleep mode wake-up time. The method can include the steps of a mobile unit entering a sleep mode and selecting a paging group, advising a base station of the sleep mode and the selection of the paging group and coordinating a wake-up time of the sleep mode with a second power saving mode. The second power saving mode can include a common availability time for mobile stations communicating with the base station to detect signals from the base station. As an example, the second power saving mode can be an idle mode, and the common availability time can be a listening interval of the idle mode. Thus, mobile stations can maintain the quick set-up times of a sleep mode, but the base station can be relieved of the haphazard nature of transmitting messages to the mobile stations in this mode, given the common listening interval of the idle mode.

Referring to FIG. 1, a system 100 for coordinating a sleep mode wake-up time is shown. The system 100 can include one or more base stations 110, each having a transceiver 112 and a processor 114 communicatively coupled to the transceiver 112. In addition, the system 100 can include one or more mobile devices 116, each of which may contain at least a receiver 118 and a processor 120. The processor 120 of the mobile device 116 may be communicatively coupled to the receiver 118. In one arrangement, the system 100 may be a wide area network type of communications system, such as one that operates in accordance with the Institute of Electronics and Electrical Engineers (IEEE) standard 802.16e. Of course, the invention is certainly not limited to this particular arrangement, as the invention may apply to any other suitable communications system. Without limitation, examples of the mobile device 116 may include cellular telephones, portable digital assistants and laptop computers.

As is known in the art, the mobile device 116 may register with the base station and may eventually enter into a sleep mode in an effort to conserve battery life. As will be explained below, the wake-up time for the mobile device 116 in the sleep mode can be coordinated with a common availability time of a second power savings mode, such as an idle mode.

Figure 2:
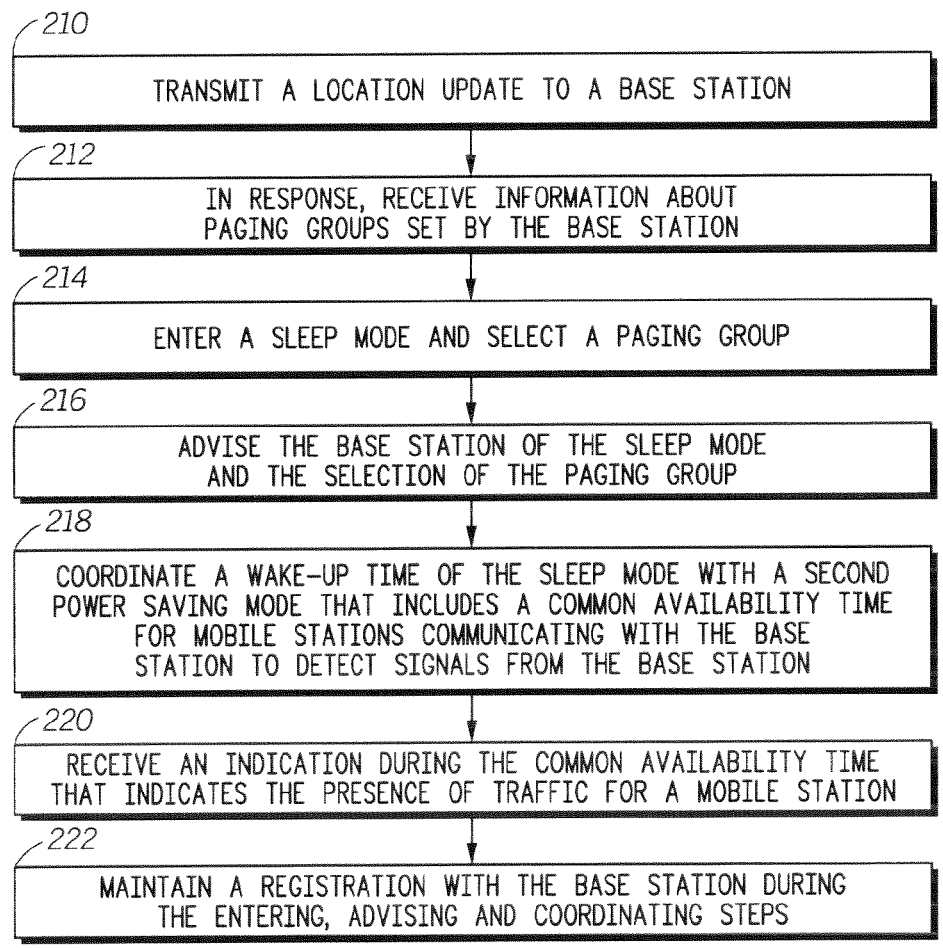
FIG. 2 illustrates a method for coordinating a sleep mode wake-up time in accordance with an embodiment of the inventive arrangements.

Referring to FIG. 2, a method 200 for coordinating a sleep mode wake-up time is shown. When describing the method 200, reference will be made to FIGS. 1 and 3—which shows an example of a paging cycle 310 of a second power saving mode 300—although it is understood that the method 200 can be practiced in any other suitable system or device and in accordance with any suitable protocol(s). Moreover, the steps of the method 200 are not limited to the particular order in which they are presented in FIG. 2. The inventive method can also have a greater number of steps or a fewer number of steps than those shown in FIG. 2.

At step 210, a location update can be transmitted to a base station, and in response, information about paging groups set by the base station can be received, as shown at step 212. Additionally, at step 214, a sleep mode can be entered and a paging group can be selected, and the base station can be advised of the sleep mode and the selection of the paging group, as shown at step 216.

For example, referring to FIG. 1, the mobile device 116 can register with the base station 110, and eventually, the mobile device 116 may wish to enter a sleep mode. A sleep mode can be defined as a mode where at least some portion of a mobile communications device is shut down for a certain amount of time in an effort to conserve power and the mobile device remains registered with a base station.

Prior to entering the sleep mode, the mobile device 116 can signal the base station 110 with a location update message. If received and properly processed, the base station 110 can then signal the mobile device 116 with a ranging response message, which may include one or more paging information TLVs (type-length-value). As an example, the paging information TLVs may include information about one or more paging groups, such as paging group identifications, paging cycles and paging offsets. As is known in the art, this paging information can relate to an idle mode operation in 802.16e, although the invention is not so limited. An idle mode can be defined as a mode where certain portions of a mobile communications device may be temporarily shut down in an effort to save power and the mobile device de-registers from the base station.

The mobile device 116 can select a paging group that can be appropriate for its applications and can signal the base station 110 with a sleep request, at which point the mobile device 116 can enter the sleep mode. This sleep request may advise the base station 110 that the mobile device 116 has entered a sleep mode and which paging group the device 116 has selected. The term "paging group" can include any group of mobile units that may be assigned to a particular timing cycle that includes a common availability time. The term "advising a base station" can mean any suitable process for informing a base station of certain parameters or conditions of a mobile unit.

Referring back to the method 200 of FIG. 2, at step 218, a wake-up time of the sleep mode can be coordinated with a second power saving mode that includes a common availability time for mobile stations communicating with the base station to detect signals from the base station. The term "coordinate" can mean any suitable action that can be taken to at least substantially synchronize two different timing cycles. Also, the term "common availability time" can mean any interval of a timing cycle where one or more mobile units may listen for signals from a base station.

Figure 3:
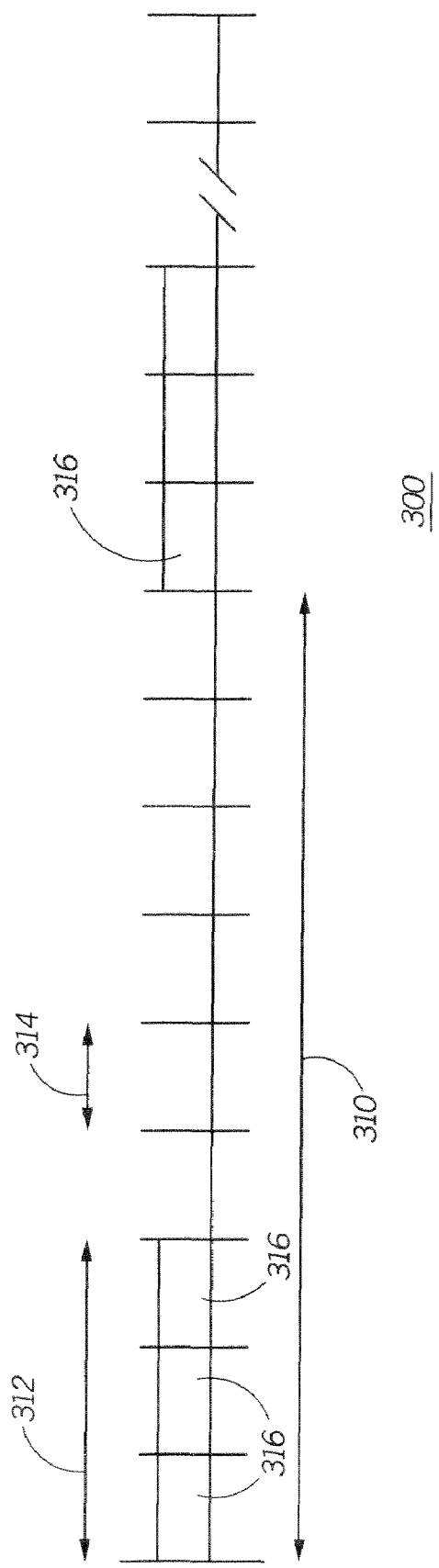
FIG. 3 illustrates an example of a configuration of a second power saving mode in accordance with an embodiment of the inventive arrangements.

For example, referring to FIGS. 1 and 3, the second power saving mode 300 may be an idle mode 300 having a number of paging cycles 310, in accordance with 802.16e. The duration of the paging cycle 310 is represented by the double arrow. In one arrangement, the paging cycle 310 can include one or more common availability times 312, which may be listening intervals (duration also represented by a double arrow) or paging listening intervals. In one arrangement, both the paging cycle 310 and the listening interval 312 can be comprised of one or more frames 314 (duration also represented by a double arrow). The listening interval 312 can define the beginning of the paging cycle 310, and the paging cycle 310 can be of any suitable duration.

Once in the sleep mode and following the selection of the paging group, the processor 120 of the mobile device 116 can coordinate a wake-up time for the mobile device 116 with the common availability time or listening interval 312 of the idle mode 300. That is, those portions of the mobile device 116 that have been shut down to conserve power can be reactivated during the listening interval 312 to allow the mobile device 116 to receive, for example, paging messages from the base station 110. Following the listening interval 312, these portions can again be shut down for the remainder of the paging cycle 310. During this modified sleep mode, however, the mobile device 116 may remain registered with the base station 110, a characteristic that is not available to a mobile unit in a conventional idle mode.

Referring back to FIG. 2, at step 220, an indication can be received during the common availability time, which can indicate the presence of traffic for a mobile station. In addition, a registration can be maintained with the base station during the entering, advising and coordinating steps, as shown at step 222.

For example, referring once again to FIGS. 1 and 3, the mobile device 116 can monitor for transmissions from the base station 110 during the listening interval 312. In particular, as is known in the art, the base station 110 can transmit one or more paging messages 316 over one or more of the frames 314, which the mobile device 116 can receive during the listening interval 312. As is also known in the art, the paging messages 316 can be used to provide the mobile device 116 with an indication that traffic that is intended for the device 116 is present. In one arrangement, the paging message 316 can be in compliance with the IEEE standard of 802.16e, although the paging message 316 may apply to any other suitable transmission standard or protocol. Once it receives the paging message 316, the mobile device 116 can exit the sleep mode or take some other appropriate action to accommodate the incoming traffic.

In view of the inventive arrangements, the mobile device 116 can remain in a sleep mode and can coordinate its wake-up time with a listening interval 312 of an idle mode 300. Because it may be specific to a particular paging group, a plurality of mobile devices 116 may be in sleep mode and may synchronize their wake-up times with the listening interval 312. As such, the base station 110 can transmit the paging messages (or other suitable indicator) during a common time, which can eliminate the unicast or multicast approach common in conventional sleep mode. Moreover, during the modified sleep mode described above, the mobile device 116 may remain registered with the base station 110 at all times, a characteristic that is not available to a mobile unit in an idle mode. As a result, the fast set-up times that are a characteristic of sleep mode may remain in place here. As an option, a wireless carrier or some other suitable entity may charge its subscribers an additional fee to implement this feature into their mobile units. Additionally, the process described above could be invoked based on a particular location or even a particular time of day.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is;

1. A method for coordinating a sleep mode wake-up time, comprising:
    entering a sleep mode and selecting a paging group;
    advising a base station of the sleep mode and the selection of the paging group; and
    coordinating a wake-up time of the sleep mode with a second power saving mode that includes a common availability time for mobile stations communicating with the base station to detect signals from the base station;
    wherein the second power saving mode is an idle mode and the common availability time is a listening interval of the idle mode.

2. The method according to claim 1, wherein the paging group is one of a number of paging groups that are set by the base station for the idle mode and the method further comprises:
    transmitting a location update to the base station; and
    in response, receiving information about the paging groups set by the base station.

3. The method according to claim 1, further comprising receiving an indication during the common availability time that indicates the presence of traffic intended for a mobile station.

4. The method according to claim 3, wherein the indication is a paging message.

5. The method according to claim 1, further comprising maintaining a registration with the base station during the entering, advising and coordinating steps.

6. The method according to claim 1, wherein the idle mode is a mode that mobile stations enter and then de-register from the base station.

7. A mobile device, comprising:
    a receiver for communicating with a base station; and
    a processor that is communicatively coupled to the receiver, wherein in a sleep mode, the processor is operable to:
        instruct the receiver to selectively shut down; and
        coordinate a wake-up time for the receiver with a common availability time of a second power saving mode such that the receiver activates during the common availability time to receive a message from the base station;
    wherein the second power saving mode is an idle mode and the common availability time is a listening interval of the idle mode.

8. The device according to claim 7, wherein the processor is further operable to select a paging group that is set by the base station for the idle mode and the paging group has a pre-defined listening interval.

9. The device according to claim 7, wherein the message is a paging message that indicates the presence of traffic intended for the mobile device.

10. The device according to claim 7, wherein during the sleep mode, the processor is further operable to maintain a registration with the base station.

* * * * *